United States Patent [19]
Atkinson et al.

[11] 4,190,206
[45] Feb. 26, 1980

[54] DRIP IRRIGATION SYSTEM

[75] Inventors: Gordon E. Atkinson; Kenneth C. Tregillus, both of Yellow Springs, Ohio

[73] Assignee: Vernay Laboratories, Inc., Yellow Springs, Ohio

[21] Appl. No.: 920,804

[22] Filed: Jun. 30, 1978

[51] Int. Cl.² ............................ B05B 1/02; B05B 1/30
[52] U.S. Cl. .................................. 239/271; 138/46; 239/533.13; 239/542; 239/547
[58] Field of Search .................... 251/120; 137/513.5, 137/846; 138/40, 44–46; 239/271, 272, 533.1, 533.13, 542, 547, 570

[56] References Cited
U.S. PATENT DOCUMENTS 2,308,955  1/1943  Wilson et al. ............... 137/846 X
4,095,745  6/1978  Christy et al. ............... 239/542 X
4,132,364  1/1979  Harmony ......................... 239/542

Primary Examiner—Bruce H. Stoner, Jr.
Assistant Examiner—Andres Kashnikow
Attorney, Agent, or Firm—Biebel, French & Nauman

[57] ABSTRACT

A drip irrigation system which includes a flow control valve having an inlet opening which constricts in response to pressure increases to provide a uniform flow despite pressure variations. The inlet opening of the valve has a rectangularly cross-sectioned central section and end sections which are non-rectangular, such as triangular or semi-circular, in cross section. During normal flow conditions the rectangular central section of the inlet opening is pressed closed and irrigation liquid flows at a constant rate through the two end sections.

9 Claims, 11 Drawing Figures

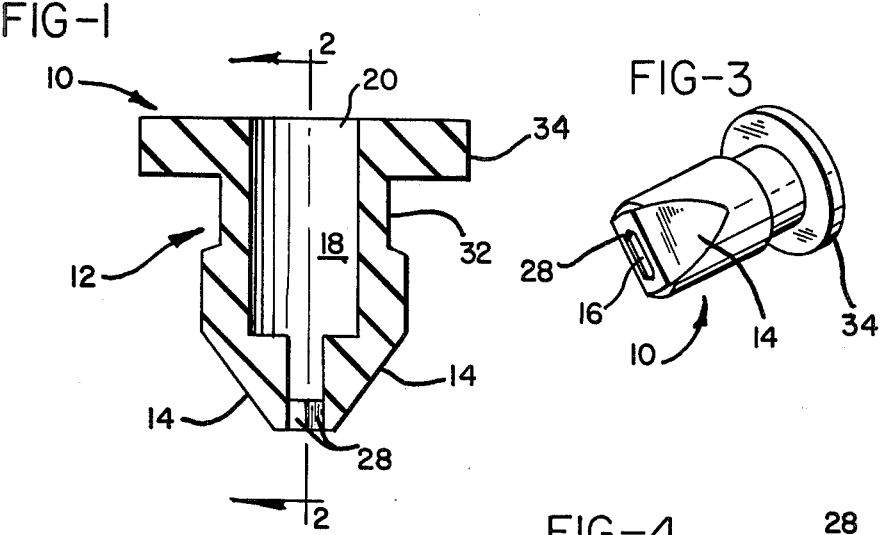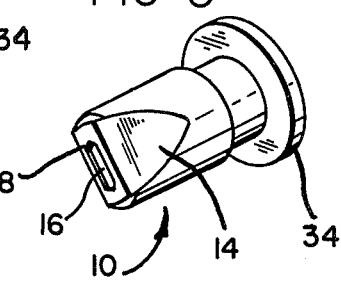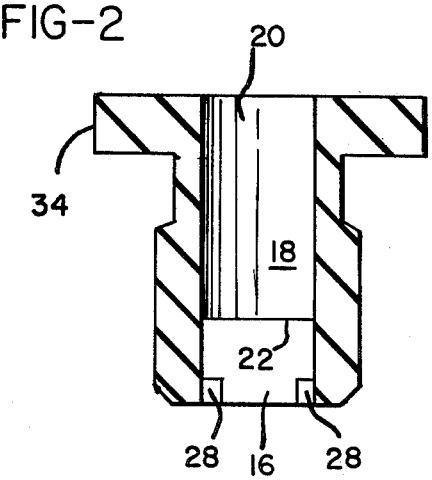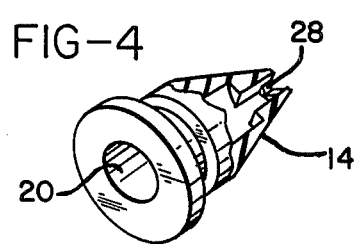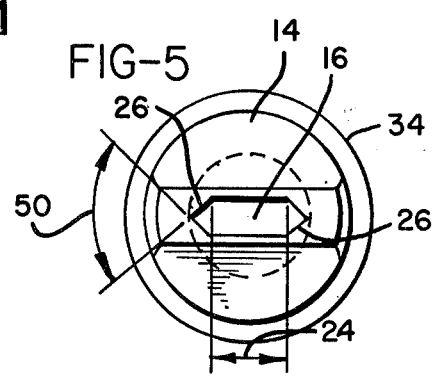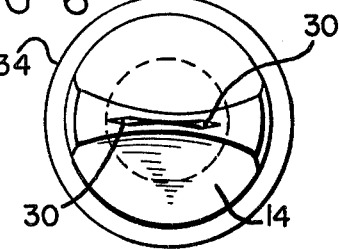

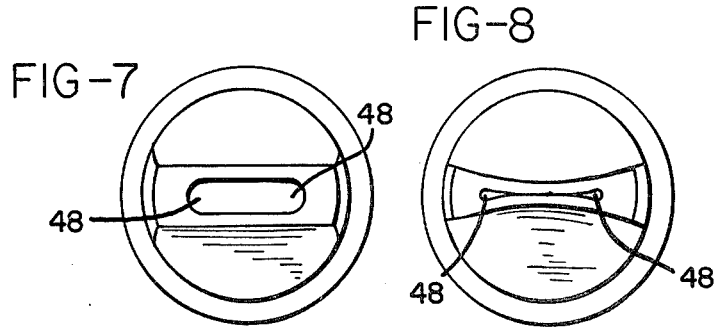
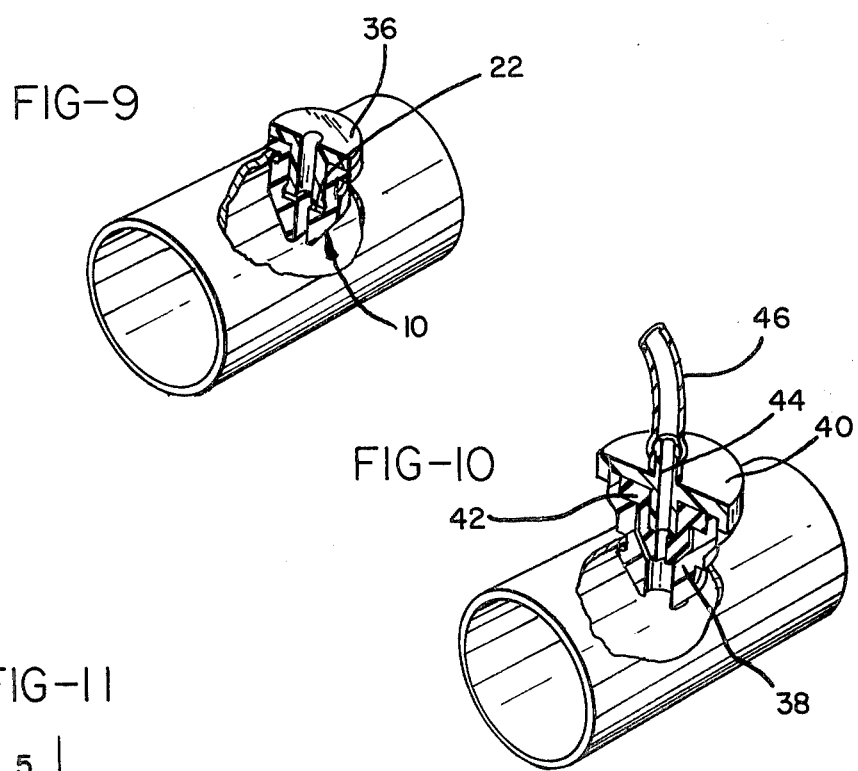
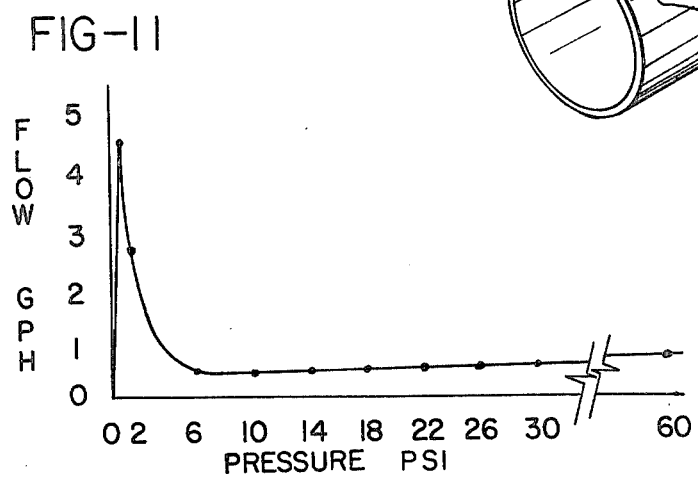

DRIP IRRIGATION SYSTEM

BACKGROUND OF THE INVENTION

In the operation of a drip or trickle irrigation system it is of prime importance that a small, yet uniform flow of water be delivered without danger of the system or parts of the system becoming permanently clogged by small particles of dirt or the like which are usually found in irrigation water.

U.S. Pat. No. 4,008,853, dated Feb. 22, 1977, discloses an emitter suitable for drip irrigation which provides both flow control and self-purging features. While the valve of this patent does provide desirable operational features it will be appreciated that it is somewhat difficult to mold in great quantities to exact tolerances.

U.S. Pat. No. 3,970,251, dated July 20, 1976, discloses an emitter valve design to provide constant flow rates under varying line pressure. Reference should also be had to several patents cited in U.S. Pat. No. 3,970,251, as representative of the state of the art in systems of this type.

U.S. Pat. No. 4,113,180, dated Sept. 12, 1978, discloses an emitter valve design having a longitudinal drip duct extending through the flow passage thereof. Application of fluid pressure causes the walls of the flow passage to collapse, limiting fluid flow through the valve solely to flow through the drip duct.

SUMMARY OF THE INVENTION

The present invention provides a drip or trickle irrigation system in which the emitter valve is of simplified construction and yet provides superior flow control qualities to assure the deliverance of irrigation liquid at substantially uniform flow rates despite variations in line pressure.

The emitter valve consists principally of a one-piece elastomeric body having a pair of converging lips which terminate in spaced apart relationship to each other and define an inlet opening to a port extending through the valve. The inlet opening has a substantially rectangularly cross-sectioned central section and a pair of non-rectangularly cross-sectioned end sections on opposite ends of the central section. The end sections, for example, may be triangularly or semi-circularly shaped in cross section.

Emitter valves in accordance with the present invention will usually be installed in openings formed in the wall of an irrigation pipe with the inlet end of the valve disposed within the pipe, although the valves could be used in other ways, such as installed in the end of an irrigation tube.

Regardless of the specific type of conduit involved and the manner in which the valve is installed, as line pressure increases a point is reached at which the central section of the inlet opening abruptly closes, resulting in a pair of inlets at opposite ends of the central section. These inlets will vary in cross-sectional area inversely with respect to line pressure to provide a substantially constant rate of flow despite changes in pressure.

In a typical installation an emitter valve will free flow at a rate of approximately four and one-half gallons per hour at a pressure of approximately 1.5 PSI. At approximately 2 PSI the central section of the inlet opening abruptly closes and thereafter the valve delivers a relatively constant flow of 0.5 gallons per hour over a substantially wide range of pressures.

Typically systems of this type are cycled and if a valve is blocked by a dirt particle or the like during the irrigation operation, when the system is shut down in accordance with a normal operation cycle the inlet end opens fully to allow any particles to pass through the valve. Thus, as the high pressure in a line decays following shutoff the inlet end of the valve will open, permitting a flushing flow through the valve to occur. Similarly, at start up there will be a flushing flow at low pressure until the inlet opening closes in the manner described above.

In this regard, it should also be noted that during the irrigation operation a pair of inlets are provided for each valve so that if one of the inlets is blocked the other will still provide irrigation, although at half the design flow rate, so that irrigation is not completely terminated until the system is cycled.

It will also be noted that the emitter valve of the present invention is relatively simple in construction, rendering it inexpensive to manufacture in large quantities and to close tolerances.

BRIEF DESCRIPTION OF THE DRAWINGS

FIG. 1 is a cross-sectional view through a valve in accordance with the present invention;

FIG. 2 is a cross-sectional view taken on line 2—2 of FIG. 1;

FIG. 3 is a perspective view of the valve as seen from the inlet end;

FIG. 4 is another perspective view of the valve seen from the outlet end and with portions broken away;

FIG. 5 is an end view of the valve showing the inlet opening of the valve in its fully open or flushing position;

FIG. 6 is a view similar to FIG. 5 but showing the valve in a controlling position;

FIGS. 7 and 8 are views similar to FIGS. 5 and 6, but showing a modified form of the invention;

FIG. 9 is a perspective view of a conduit with a valve of the present invention installed and with a rigid insert added to retain the valve in place in the conduit;

FIG. 10 is a view similar to FIG. 9 but showing a modified form of the valve enclosed in a housing; and FIG. 11 is a graph showing typical operating characteristics of a system in accordance with the present invention.

DESCRIPTION OF THE PREFERRED EMBODIMENT

A valve 10 in accordance with the present invention includes a body portion 12 terminating in a pair of converging lips 14 which terminate in spaced apart relationship to each other to form an inlet opening 16. A port 18 extends through the body of the valve and is of substantially larger cross-sectional area adjacent an outlet 20 from the valve than adjacent the inlet 16. Thus, the flow port 18 abruptly increases in area at the shoulder 22.

In accordance with the present invention the inlet opening 16 of the valve has a substantially rectangularly cross-sectioned central section 24 and a pair of non-rectangularly shaped end sections 26 positioned at opposite ends of the central section 24. It will be particularly noted from FIGS. 1 and 2 of the drawings that the non-rectangularly shaped end sections 26 extend into the valve a relatively short distance downstream of the inlet opening.

Thus, end sections 26 are defined by relatively short portions 28 extending inwardly from the inlet a relatively short distance, as best seen in FIGS. 1 and 2 of the drawings. It has been found that by limiting the length of the portions 28 more precise control can be provided than if portions 28 extended, for example, to the shoulder 22.

As seen in FIGS. 5 and 6, upon an increase in pressure on the lips 14 the inlet opening will change abruptly from the configuration seen in FIG. 5 to that seen in FIG. 6. In the FIG. 6 configuration flow through the valve is through the pair of inlets 30 whose open areas vary inversely with respect to pressure to provide a substantially constant flow rate.

This is illustrated graphically in FIG. 11 where flow in gallons per hour is plotted against pressure in pounds per square inch. Thus, it will be seen that in a typical installation flow through an individual valve is approximately four and one-half gallons per hour at a pressure of approximately 1.5 PSI, but as the pressure increases to approximately 2 PSI the inlet opening of the valve abruptly assumes the configuration seen in FIG. 6 of the drawings and thereafter flow is maintained at a relatively constant rate of 0.5 gallons per hour despite increasing pressure.

Again, it should be noted that at start up there will be a flushing flow through the fully open valve and after shut down, when line pressure decays to a certain point, there will be a further flushing flow, so that by routine cycling of the system the valves are purged of dirt and other foreign particles.

The triangularly shaped end sections permit the designed flow rate of a particular valve to be varied by simply changing the angularity of the two legs of the triangularly shaped end sections, which angularity is indicated at 50 in FIG. 5 of the drawings.

The valve of FIGS. 1 through 6 of the drawings may be simply installed in an opening formed in a pipe or other conduit, and for this purpose the valve is provided with a neck portion 32 and a head portion 34 so that upon installation the neck portion 32 will engage the wall of the conduit and head portion 34 will be positioned outside the conduit.

If desired, particularly where fairly high pressures are likely to be encountered, it will be helpful to provide a relatively rigid insert 36, as seen in FIG. 9 of the drawings, which is received in the port in the valve and serves to retain the valve in place.

FIG. 10 of the drawings shows a modified version of the valve and system of the present invention wherein the neck portion of the valve is eliminated and the valve is instead received within a two-piece, substantially rigid housing having a body portion 38 and a cap 40 which together enclose the valve 42. In other respects the valve 42 is constructed and functions the same as the valve 10. It will also be noted that with this modification a short extension 44 can be provided on the cap 40 to which a tube 46 can be attached.

As indicated above, the inlet end of the valve has a rectangularly cross-sectioned central section and non-rectangularly cross-sectioned end sections which are shown in FIGS. 5 and 6 as triangular. However, in accordance with the present invention the end sections of the inlet opening of the valve may be of other shapes such as semi-circular, and this configuration is shown at 48 in FIGS. 7 and 8 of the drawings.

From the above it will be seen that the present invention provides a simplified design which is inexpensive to construct but yet can be manufactured in large quantities to close tolerances to provide substantially constant flow rates with varying line pressures.

While the forms of apparatus herein described constitute preferred embodiments of the invention, it is to be understood that the invention is not limited to these precise forms of apparatus, and that changes may be made therein without departing from the scope of the invention.

What is claimed is:

1. In a one-piece elastomeric flow control valve including a body portion having a flow port extending therethrough and terminating in an inlet opening at one end and an outlet at the opposite end, the improvement comprising:

said inlet opening is defined by a central section and a pair of end sections positioned at opposite ends of said central section, said elastomeric material possesses an elasticity such that external pressure applied to said inlet end of said valve causes said central section substantially to close while the open cross sectional area of said end sections varies inversely in response to variations in said external pressure to regulate flow through said flow control valve at a substantially constant flow rate, and said end sections of said inlet opening extend inwardly of said valve a relatively short distance to provide precise control over flow through said inlet opening.

2. The valve of claim 1 wherein:
said end sections are triangularly cross sectioned.

3. The valve of claim 1 wherein:
said end sections are semi-circularly cross sectioned.

4. In a drip irrigation system including a conduit for carrying irrigation fluid under pressure, means defining an opening in said conduit for the flow of irrigation fluid therefrom, and a flow control valve formed of an elastomeric material and having an inlet opening communicating with said conduit and receiving fluid flow from said conduit opening, an outlet opposite said inlet opening and a flow port extending through said valve, the improvement comprising:

said inlet opening is defined by a central section and a pair of end sections positioned at opposite ends of said central section, said elastomeric material possesses an elasticity such that external pressure applied to said inlet end of said valve causes said central section substantially to close while the open cross sectional area of said end sections varies inversely in response to variations in said external pressure to regulate flow through said flow control valve at a substantially constant rate of flow, and said end sections of said inlet opening extend inwardly of said valve a relatively short distance to provide precise control over flow through said inlet opening.

5. The system of claim 4 wherein:
said end sections are triangularly cross sectioned.

6. The system of claim 1 wherein:
said end sections are semi-circularly cross sectioned.

7. The system of claim 4 further comprising:
a substantially rigid support member received within said port.

8. The system of claim 4 further comprising:
substantially rigid housing means enclosing portions of said valve.

9. The system of claim 8 further comprising:
means for attaching a tube to said housing in communication with said port.

* * * * *